Figure 1:
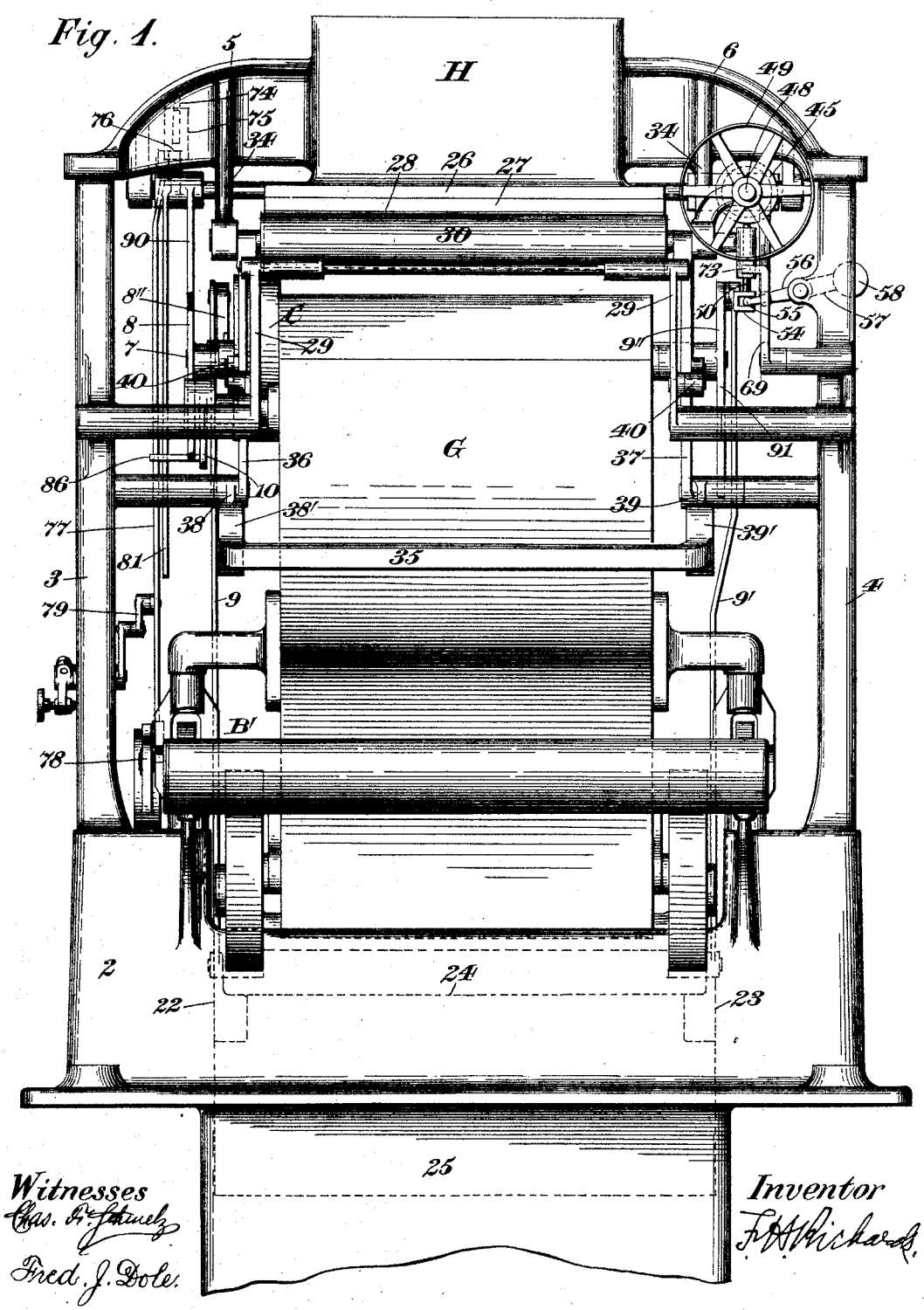

(No Model.) 9 Sheets—Sheet 1.

F. H. RICHARDS.
WEIGHING MACHINE.

No. 585,977. Patented July 6, 1897.

Witnesses
Chas. O. Schmelz
Fred. J. Dole.

Inventor
F. H. Richards (No Model.)  F. H. RICHARDS.  9 Sheets—Sheet 2.
WEIGHING MACHINE.

No. 585,977.  Patented July 6, 1897.

Witnesses
Chas. F. Schmelz
Fred. J. Dole.

Inventor
F. H. Richards.

(No Model.)   F. H. RICHARDS.   9 Sheets—Sheet 3.
WEIGHING MACHINE.

No. 585,977.   Patented July 6, 1897.

Witnesses:  Inventor:
Chas. F. Schmelz  F. H. Richards.
Fred. J. Dole.

(No Model.) 9 Sheets—Sheet 4.

F. H. RICHARDS.
WEIGHING MACHINE.

No. 585,977. Patented July 6, 1897.

Witnesses
Chas. F. Samuels
Fred. J. Dole.

Inventor.
F. H. Richards.

(No Model.)

9 Sheets—Sheet 5.

F. H. RICHARDS.
WEIGHING MACHINE.

No. 585,977.

Patented July 6, 1897.

Witnesses
Chas. F. Schmelz
Fred. J. Dole.

Inventor
F. H. Richards.

(No Model.)
9 Sheets—Sheet 6.

F. H. RICHARDS.
WEIGHING MACHINE.

No. 585,977.  Patented July 6, 1897.

Witnesses
Chas. F. Schmelz
Fred. J. Dole.

Inventor
F. H. Richards.

(No Model.) 9 Sheets—Sheet 7.

F. H. RICHARDS.
WEIGHING MACHINE.

No. 585,977. Patented July 6, 1897.

Witnesses
Chas. F. Schmelz
Fred. J. Dole.

Inventor
F. H. Richards.

THE NORRIS PETERS CO., PHOTO-LITHO., WASHINGTON, D. C.

(No Model.) 9 Sheets—Sheet 8.

F. H. RICHARDS.
WEIGHING MACHINE.

No. 585,977. Patented July 6, 1897.

Witnesses
Chas. F. Schmelz
Fred. J. Dole

Inventor
F. H. Richards (No Model.) 9 Sheets—Sheet 9.

F. H. RICHARDS.
WEIGHING MACHINE.

No. 585,977. Patented July 6, 1897.

Witnesses
Chas. L. Schultz
Fred. J. Dole.

Inventor
F. H. Richards,

UNITED STATES PATENT OFFICE.

FRANCIS H. RICHARDS, OF HARTFORD, CONNECTICUT.

WEIGHING-MACHINE.

SPECIFICATION forming part of Letters Patent No. 585,977, dated July 6, 1897.

Application filed November 13, 1896. Serial No. 612,016. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing and delivering various kinds of granular and other free-flowing substances.

With respect to one of its features the invention comprehends the provision of improved valve mechanism, including stream-supply means or a hopper and a flexible valve therefor and instrumentalities for carrying or stretching said valve across the discharge-orifice of the hopper, whereby when the valve is in its closed or partially-closed position it will present a yielding surface to the mass within the hopper, so that should there be lumps therein the valve will "give," the usual tendency of the material to clog or block at this point being thereby wholly removed, and the valve by its action, as it opens and closes alternately, will prevent the adherence of material thereto. In the form of the invention illustrated the valve will be suitably attached at its ends, one of the points of attachment being to a relatively-fixed part, a coöperative movable device being employed to engage the valve between its ends, so that it may be carried across the outlet of the hopper to properly regulate the passage of material therefrom.

Another object of the invention is to furnish in operative relation with the shiftable load-discharge member of the weighing mechanism, which in the present case is the closer for the bucket, hinged adjacent to the discharge-outlet of the latter, means for retarding the respective strokes of such load-discharge member, so that the jar and shock generally incident to such parts will be precluded, and in connection with such retarding means to employ instrumentalities of a proper character for varying the amount of resistance applied to the shiftable load-discharge member to better adapt the machine to different classes of work.

Another object of the invention is to provide safety-stop devices so operable as to insure the regular or determined operation of the respective parts of the weighing mechanism and its adjunctive devices, thereby enhancing the accuracy of the machine.

Figure 2:
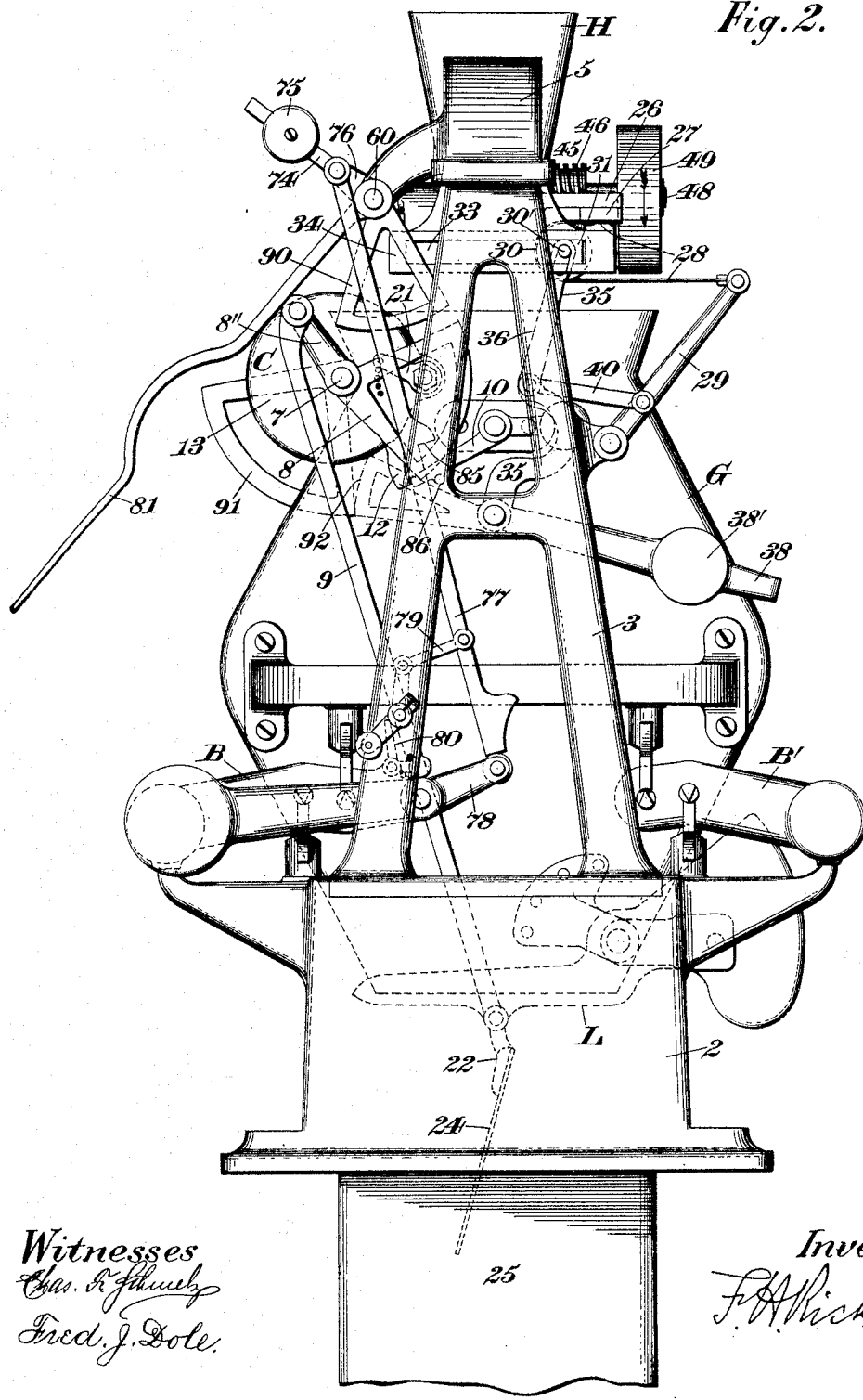
Figure 3:
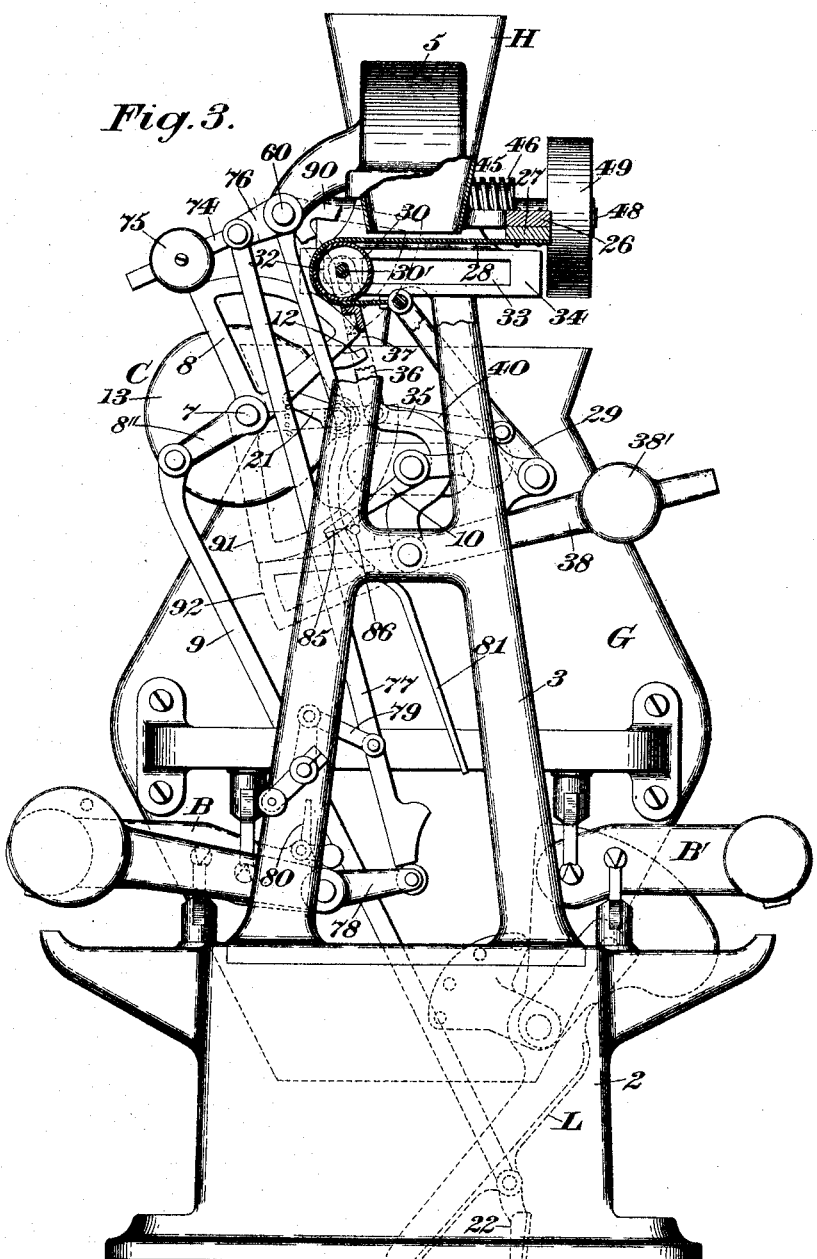
Figure 4:
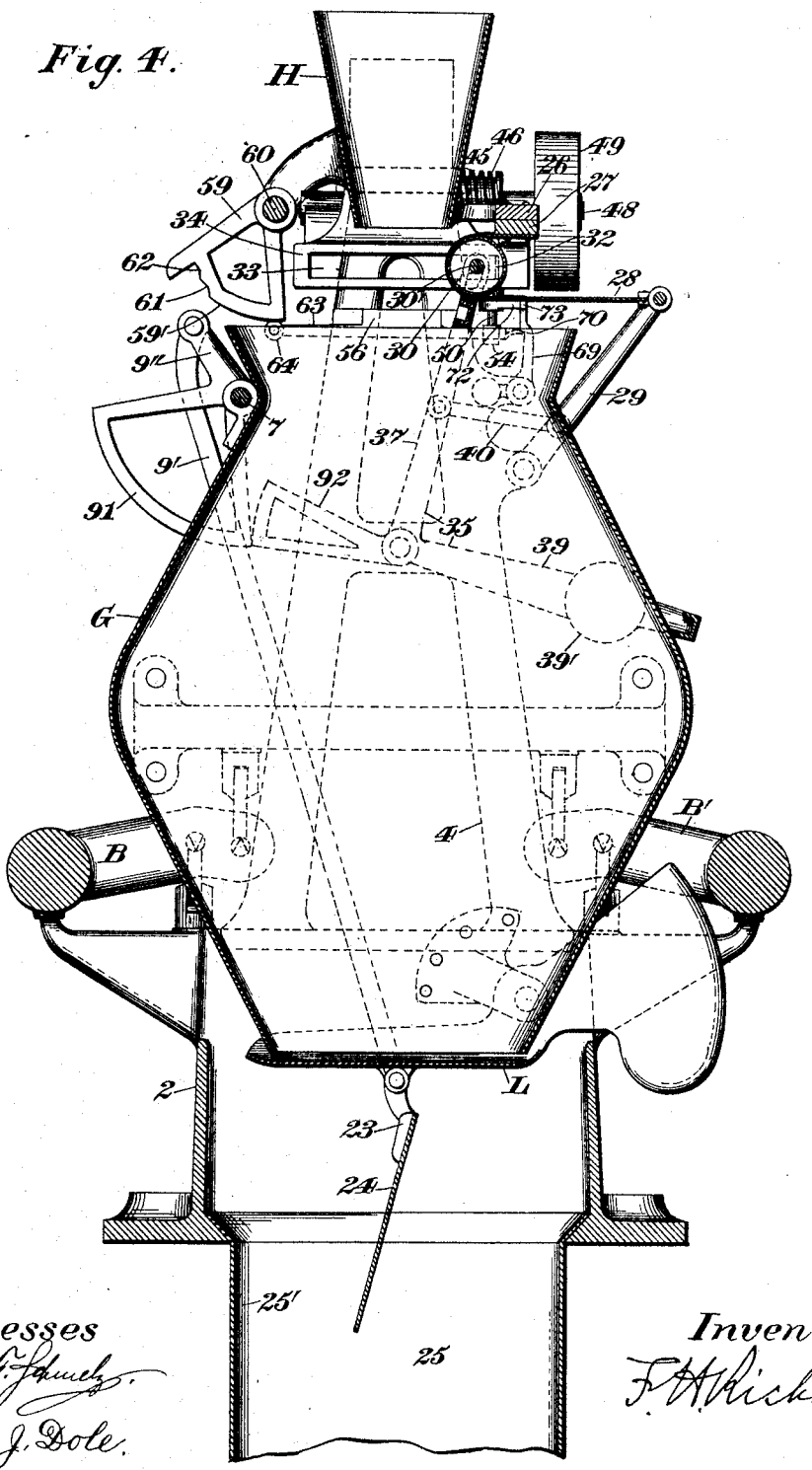
Figure 5:
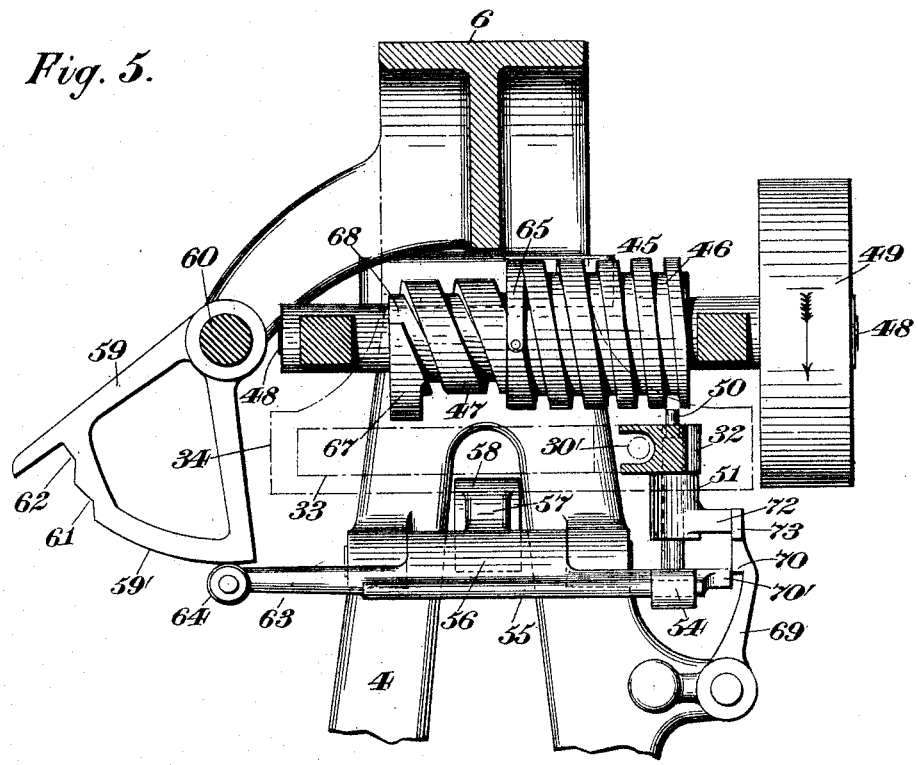
Figure 6:
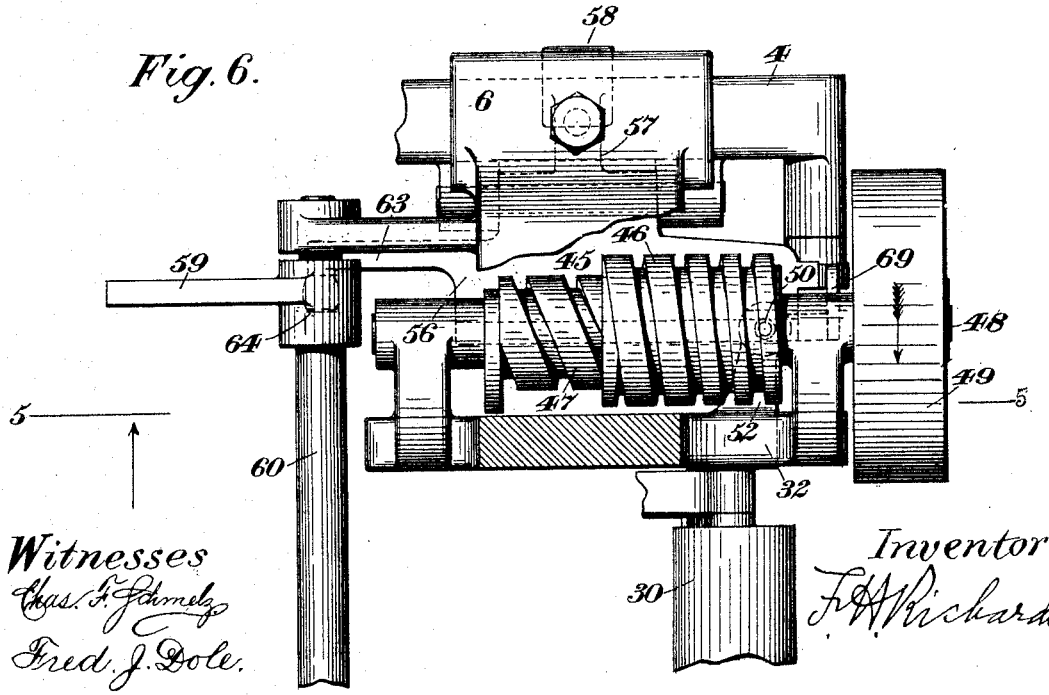
Figure 7:
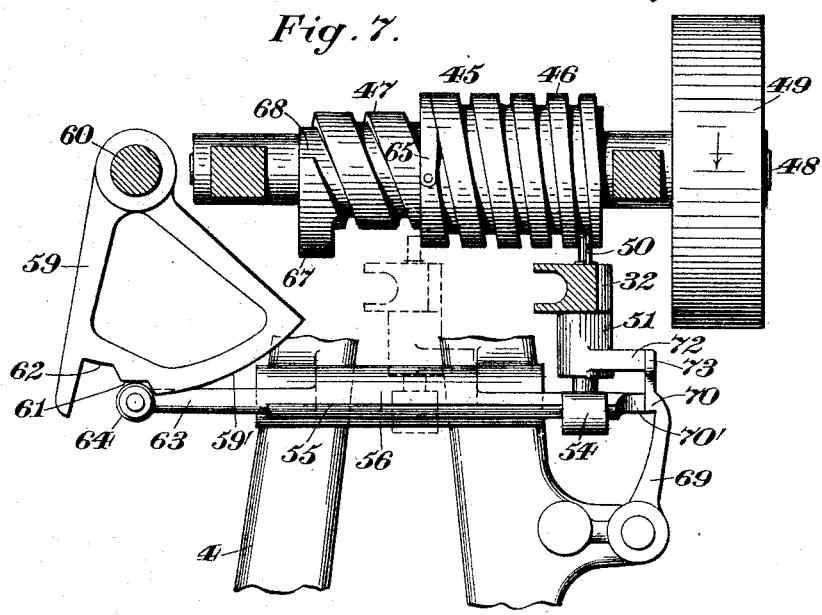
Figure 8:
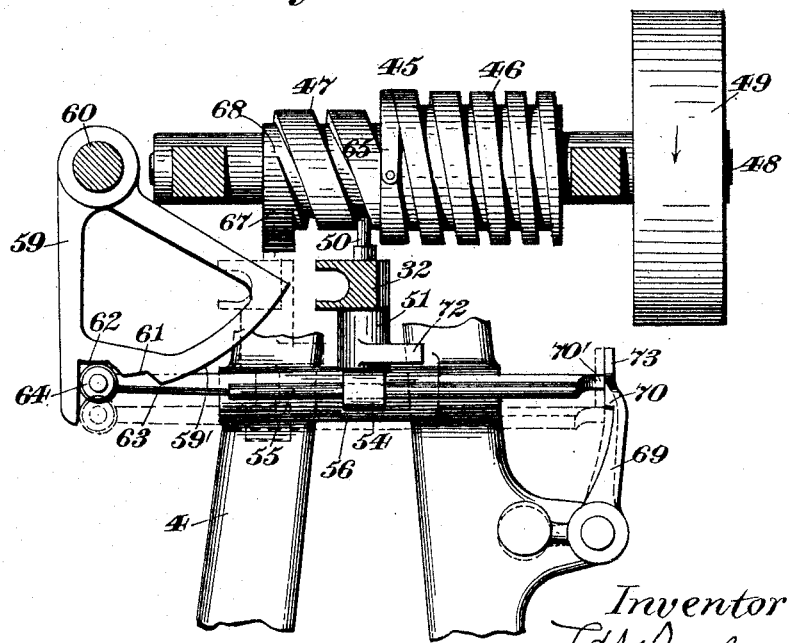
Figure 9:
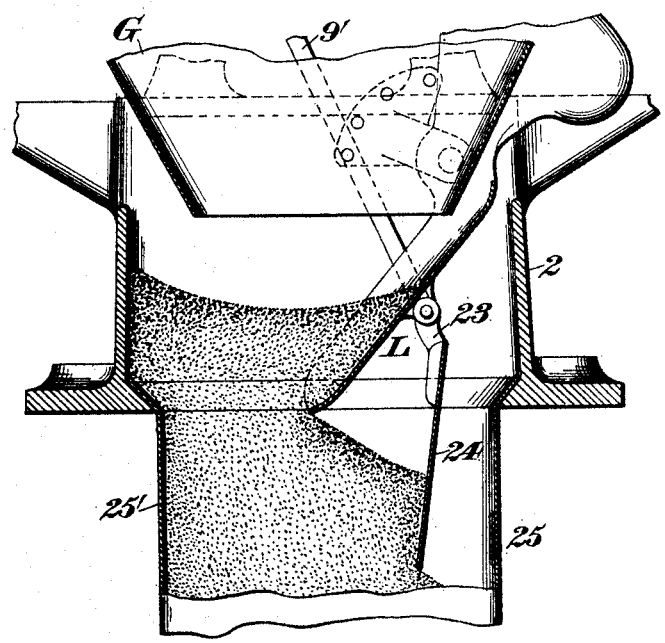
Figure 10:
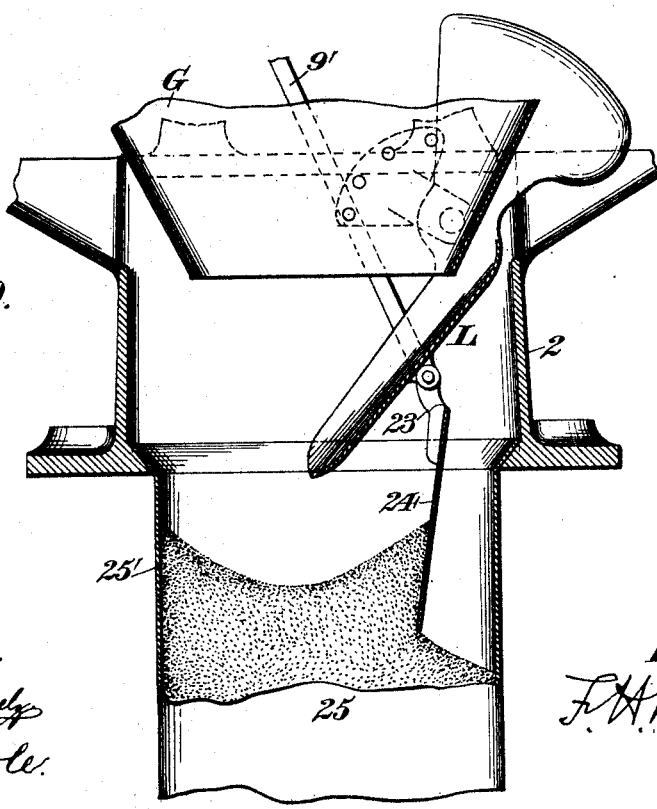
Figure 11:
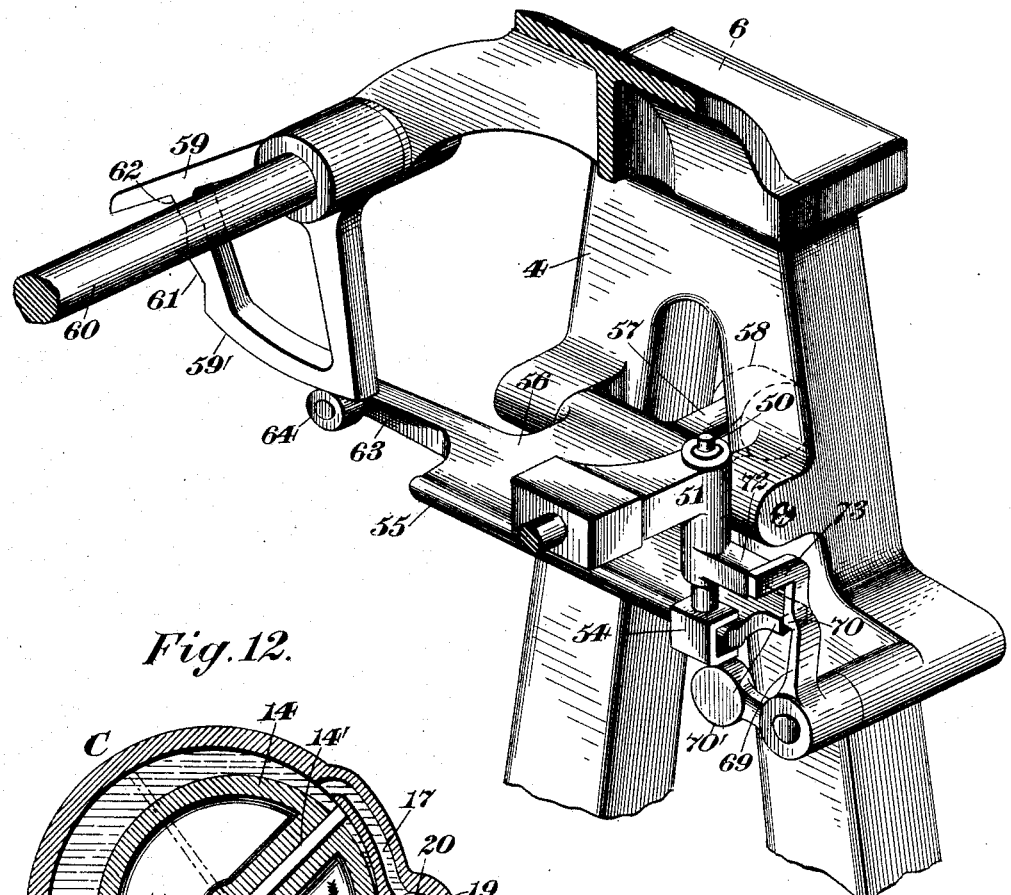
Figure 12:
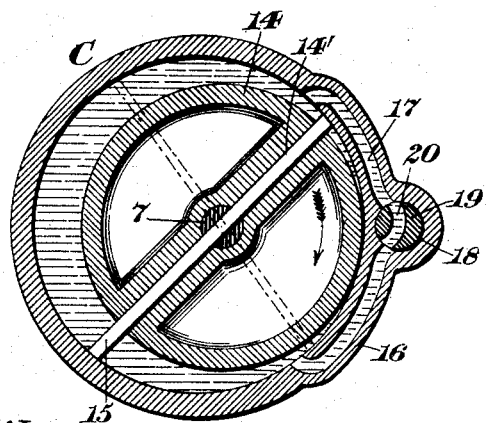

In the drawings accompanying and forming part of this specification, Figure 1 is a front elevation of a weighing-machine embodying my present improvements, and it indicates the positions occupied by the various parts at the commencement of operation. Fig. 2 is an end elevation as seen from the left in Fig. 1. Fig. 3 is a similar view, the valve mechanism being in section to show the supply-valve shut and the bucket-closer being wide open. Fig. 4 is a longitudinal central vertical section of Fig. 1. Fig. 5 is a detail view in elevation, with a portion in section on the line 5 5, Fig. 6, looking toward the right, and it represents the valve actuating and controlling mechanism, the parts being in positions corresponding with Figs. 1, 2, and 3. Fig. 6 is a plan of Fig. 4 with a fragment of the framing removed. Figs. 7 and 8 are views similar to Fig. 5 and illustrate the positions occupied by the valve controlling and actuating mechanism at the commencement and close of the poising period, respectively. Figs 9 and 10 are detail views of the lower part of the bucket mechanism, it and the framing being in central vertical section, and they illustrate a means for impeding the return movement of the closer. Fig. 11 is a perspective view, on an enlarged scale, of the subject-matter shown in Fig. 5 with the screw removed. Fig. 12 is a detail view, in central section, of the means provided for retarding the respective strokes of the load-discharge member or closer of the weighing mechanism; and Figs. 13 to 18, inclusive, are detail views of the stop mechanism for effecting the regular operation of the various parts of the coöperative members of the machine.

Similar characters designate like parts in all the figures of the drawings.

The weighing mechanism is similar in construction and mode of operation, except in the particulars hereinafter specified, to that disclosed by Letters Patent No. 548,840, granted to me October 29, 1895, to which reference may be had, and it includes a load-receiver or bucket and supporting-beam mechanism therefor.

The framework for carrying the operative parts of the machine or apparatus may be of any suitable character; and it consists in the present instance of the chambered base 2, the end frames 3 and 4, which rise therefrom, and the brackets 5 and 6, which extend oppositely from the hopper H and which are suitably attached to the end frames 3 and 4, respectively.

The load-receiver or bucket G is in the form of a hopper and has the usual discharge-outlet controlled by a closer or shiftable load-discharge member.

The beam mechanism for supporting the bucket consists of a pair of counterweighted scale-beams B and B', respectively fulcrumed or mounted upon the base 2 and pivotally carrying the bucket G.

While I have herein illustrated a bucket of the well-known "vertically-reciprocatory" class, it is obvious that other types might be employed as receptacles for the charges to be weighed.

The closer L is hinged to the bucket or brackets thereon for reciprocatory movement, and it consists of a substantially flat plate which is contiguous to the lower edge of the bucket when in its shut position, said closer being also counterweighted, the office of the counterweight or counterweights being to return said closer to its normal or shut position on the discharge of a bucket-load.

The means for maintaining the closer L in its shut position will now be briefly described, and it includes, in the form illustrated herein, a toggle of the "inverted" class and a detent or latch for engaging one of the toggle members to thereby hold the closer shut.

The bucket G carries, near the upper rearward side thereof and in brackets thereon, the rock-shaft 7, to which is affixed the rocker 8, constituting one of the members of the toggle to which I have previously referred, the rod 9, which is pivoted to an arm of said rocker and to the closer L, constituting the other member of said toggle, said rocker or toggle member 8 being engaged by the latch 10 when the closer is shut, as represented in Fig. 2, the several toggle-pivots at this time being virtually in line, whereby the amount of force necessary to hold the respective oscillating parts against movement is minimized.

The closer-latch 10 is pivoted to the bucket and is also counterweighted, it swinging upward to engage the coöperating arm 12 on the rocker.

In connection with the shiftable load-discharge member of the weighing mechanism, which in the present instance is the bucket-closer, I provide means for retarding the respective strokes thereof as it discharges the load and resumes its normal or load-receiving position, whereby the shock and jar generally incident to these parts as they thus operate are obviated.

The means employed for retarding the respective strokes of the closer consist of a fluid-casing and a piston or blade located therein, said piston being operative with the closer and its strokes being more or less restricted by a body of fluid which can pass from one chamber to the other of the fluid-casing as said piston oscillates back and forth with the closer, the action of the latter being retarded in correspondence with said blade.

The flow of the liquid between the two chambers will be regulated by a suitable valve to vary the pressure applied to such piston and also to the closer in accordance with the characteristics of different materials to be weighed.

The fluid-casing is designated by C, it being disposed about the rock-shaft 7 and secured to the bucket by suitable attaching means and having a movable face-plate 13, by which access may be had to the interior to fill the same with a liquid. The casing has internally thereof the hollow disk 14, which is diametrically bored, as at 14, and is carried by the shaft 7, said disk being eccentric to the casing C. The shaft 7 is furnished with a transverse slot through which is passed the piston or blade 15 and which also extends entirely through the bore of the disk 14, thereby serving the purpose of a key for said disk, said piston or blade having an approximately rubbing contact with the inner circular face of the casing C as it reciprocates therein. The casing C at one side thereof has the enlargement 16, in which is formed a relatively long channel or port 17, which provides a passage for the fluid or oil from one to the other of the two chambers of the casing, said chambers being formed by the piston or blade 15 and being of changeable area as the said piston oscillates back and forth. The longitudinal channel 17 is intersected by the valve-chamber 18, in which is located the throttle-valve 19, the port of which is designated by 20 and which communicates with the longitudinal channel 17, so that by restricting the size of the normal flow of the body of fluid which passes between the two chambers the action of the blade 15, and hence the closer L, will be likewise checked.

The normal position of the piston or blade 15 is represented by full lines in Fig. 12, the closer L being shut and locked in such position by the latch 10, which is in engagement with the arm 12 of the rocker 8, the limit of the working stroke of said piston being indicated by the dotted lines in said figure.

Let it be assumed that the latch 10 has been tripped, thereby releasing the closer L. At this stage said closer will be forced open by the weight of the contents within the bucket, hence drawing the rod 9 and the rocker-arm 8'' downward and rocking the shaft 7 in its bearings, so that when the closer L has reached the limit of its opening movement the blade 15 will have been carried from its normal position to the dotted-line position, the throttle-valve 19 being partially closed, as indicated, to retard the passage of the fluid, which is advanced by the blade 15 on its effective movement from one chamber to the other of the casing C through the longitudinal channel 17, and on the return movement of the blade the reverse action will take place. By properly manipulating the valve the amount of resistance applied to the blade as it travels back and forth may be varied and at will, in accordance with the different materials to be weighed.

The valve 19 will be furnished with a suitable crank, as 21, which has a pin in its outer end to be thrust in any one of a series of recesses in the casing C to hold the valve in an adjusted position, the crank-arm 21 being preferably of resilient material to facilitate such an adjustment.

In connection with the bucket-closer I employ a regulator which is movably connected to said closer and which normally occupies an approximately upright position, so that said regulator can take hold of a mass of material discharged by the weighing mechanism to thereby impede the return movement thereof to allow ample time for the full and complete discharge of the bucket-load, said regulator being in the form of a flat plate, its point of connection with the closer being relatively remote from the discharge edge thereof.

The rod 9, to which I have previously referred, has a mate 9', which moves in unison therewith and which is connected to the crank-arm 9'' on the rock-shaft 7. (See Fig. 1.) The two rods 9 and 9' are extended, as shown at 22 and 23, below the lower face of the closer L, and said extended portions have flat bearing faces or wings, to which may be riveted or otherwise secured the flat regulator-plate 24. I locate below the chamber of the hollow base 2 the conduit or hopper 25, said hopper having an angular flange about its inlet-opening which is properly attached within the chamber of the base 2. The load of material from the bucket on the opening of the closer will be discharged against the wall 25' of the hopper 25, in which the mass is temporarily confined, so that it may be readily acted upon by the flat plate 24, whereby the return of the closer may be sufficiently delayed to permit all particles of material to pass therefrom, as indicated clearly in the detail views Figs. 9 and 10.

The valve for the supply-hopper H will be flexible and will reciprocate beneath the discharge-orifice of said hopper to arrest or permit the supply to the bucket, said valve being of leather, canvas, or similar pliable material and being secured at one end to a fixed part, while the other end of the valve is connected to a reciprocatory member operative with or controlled by the weighing mechanism, a movable device being provided to engage the valve between its ends to carry or stretch it across the outlet of the hopper.

The front wall of the hopper H, near the lower edge thereof, is provided with a bracket 26, to the under face of which is attached the longitudinal strip 27, and to said strip is fastened one end of the flexible valve 28, the other end of said valve 28 being secured to the transverse member of the longitudinal rocking frame 29, the opposite arms of said rocking frame being pivotally connected to lugs on the end frames 2 and 4, respectively.

The means employed for carrying the valve across the discharge-orifice of the hopper H to cut off the down-flowing stream of material therefrom consist of the hollow roll 30, the shaft 30' of which is rotatively supported by the blocks 31 and 32, which reciprocate back and forth in the guideways 33, formed in the hangers 34, which depend from the brackets 5 and 6, the ratio of movement of the valve actuating or closing roll 30 being as two is to one relative to the oscillating or rocking frame 29, whereby as the valve opens and closes it may be maintained taut, or comparatively so, to properly control the supply-stream.

I provide a second valve-controlling rocking frame consisting of a plurality of arms which emanate from a common axis, said frame being supported by the standards 3 and 4 and involving means for effecting an opening movement of the valve. Such frame is designated in a general way by 35, while the respective arms thereof are denoted by 36, 37, 38, and 39, the arms 36 and 37 and 38 and 39 being joined by a pair of tie bars or rods and the arms 38 and 39 being furnished with counterweights 38' and 39', which are in parallelism and of a sufficient mass to cause the opening movement of the valve by returning the roll 30 to its normal position. The two rocking frames are connected for movement in unison by the link 40, which is pivoted, respectively, to said frames, the respective arms of which are of such length and the disposition of the link 40 being such as to insure the requisite ratio of movement between the several valve-actuating parts to maintain the valve 28 substantially taut as it moves back and forth alternately. The two arms 36 and 37 will be connected by sliding joints to the opposite ends of the roll-shaft.

To obtain a perfect control of the supply-stream which emerges from the supply-hopper, I prefer to apply to the valve different degrees of or a variable closing force. The closing movement of the valve is divided into two distinct or separate stages, during the first one of which the valve will be closed with a progressively-increasing speed up to the poising period, which is the end of the first stage, at which time the further progress of the valve will be temporarily or momentarily interrupted to permit the passage of the drip-stream into the bucket to complete the partial load already delivered thereto. On the completion of the load the valve will be closed to cut off the drip-stream or the last part of the supply, and this final movement of the valve will be a very rapid or accelerated one to promptly cut off the stream.

The valve-closing mechanism comprehends a screw which is of the "compound" type, and it is of different diameters, it being composed practically of two sections carried by a rotating shaft, the thread of which may be engaged by a pin or equivalent device operative with the valve to thereby advance the valve with the proper amount of speed to effect the reduction and subsequent cut-off of the supply-stream.

The screw for imparting the necessary movement to the pin to be transferred to the valve and to which I have referred is designated in a general way by 45, its two sections being denoted by 46 and 47, respectively, said screw being carried by the shaft 48, which is rotatively supported by suitable bearings or brackets on the framing of the machine, said shaft also carrying the driver or power wheel 49, which will be connected by belting or other means to a suitable motor, (not shown,) such organization being clearly illustrated in the detail views Figs. 5 to 8, inclusive.

The flexible valve 28 will be normally located at one side of the outlet of the hopper II to permit the free and unobstructed gravitation of the full supply-stream to the bucket, (see Fig. 2,) and the pin or member which engages the valve-operating screw will be held at one side of or beyond the plane of rotation of said screw by a suitable stop, which subsequently releases the same, said pin being then instantly thrust across the plane of the screw, so that the thread thereof may advance the pin, and consequently the valve which is coöperative therewith, to carry or stretch said valve across the outlet of the hopper.

The pin to which I have just referred is designated by 50, it being longitudinally reciprocatory or supported for sliding movement within the elongated bore of the carrier 51 and its working end being slightly reduced in diameter and equal to the width between the threads of the screw 45 to thereby facilitate an engagement between said parts.

The pin-carrier 51 is in the form of a sleeve or collar, and it may be conveniently formed integral with the lateral extension 52 of the journal-block 32, which carries the roll-shaft 30'.

The pin 50 terminates at its lower end in a guide-block 54, which is provided with parallel flanges embracing the longitudinal rib 55 of the guide 56, which is in the form of a plate, said guide being of a less width at its rear and provided with projecting trunnions, which are journaled in suitable bearings extending inward from the framing of the machine, so that the guide-plate 56 may have the requisite amount of rocking movement.

Means are provided for actuating the plate 56, whereby the pin 50, which is connected thereto, may be forced across the plane of the valve-actuating screw 45, but I provide a stop to normally limit or prevent such action until a certain proportion of the load has been supplied to the bucket.

For the purpose of obtaining simplicity I make the guide-plate 56 self-active, it being furnished with a laterally-extending arm 57, which carries a weight 58, said weight exerting a force sufficient to readily raise the plate and the pin 50 to carry the latter into engagement with the thread or threads of the screw 45.

The stop for governing or holding the guide-plate 56, and hence the pin 50, normally in their ineffective positions is designated by 59, said stop being coöperative with and controlled by the weighing mechanism and it being affixed to the rock-shaft 60, which is supported by depending arms on the brackets 5 and 6, respectively. The working face 59' of the stop 59 is concentric with the axis of movement of said part, and it terminates in a series of notches or stops of differential depths, two of such notches being shown, the first being designated by 61, while its mate, and the deeper, is designated by 62, and the peculiar function of said stop 59 and its two notches will be hereinafter set forth.

The pitch of the screw-section 46 or the threads thereof is a gradually-increasing one from the point at which the pin 50 enters the same, and when said pin passes entirely out of contact with said screw-section it may engage the supplemental or succeeding member 47 to further advance the valve, the closure of the latter, however, being interrupted at the time when the pin leaves the screw-section 46.

The plate 56 is provided with a lateral arm 63, having the antifriction-roll 64, which is contiguous to the curved working face 59' of the stop 59, whereby when these parts are in contact, as represented by Fig. 5, the upward movement of the plate 56 will be prevented and the pin 50 consequently held at one side or below the plane of the screw-section 46. As the bucket and beam mechanism descend the stop 59 will be swung to the right and until the notch 61 is opposite the roll 64, at which time the latter will be instantly forced into said notch 61 by the raising of the plate 56, caused by the dropping of the counterweighted arm 57 on the release of said plate by said stop, and the pin 50 will be concurrently thrust between the threads of the screw-section 46, (see Fig. 7,) so that the shaft 48 and driver 49, rotating in the direction indicated by the arrow, the pin 50, its carrier 51, the roll-shaft 30', and the roll 30 will be carried to the left with a rapidly or progressively increasing velocity, such action stretching the valve 28 across the outlet of the hopper II, and consequently raising the two rocking frames 56 and 29.

A suitable device is provided for preventing retractive or reverse movement of the pin 50 and its carrier 51 when the former passes out of contact with the screw-section 46, and the same consists of a suitable switch, as 65, which practically forms a continuation of the thread of said screw-section, said switch being pivoted to the body of said screw-section, so that when the pin has nearly passed out of contact therewith the switch will be swung outward thereby, and on the continued rotation of the screw-section the switch will meet the pin, which serves practically the function of a resistance member or fixed abutment and will be returned to place thereby and flush with the end face of the screw-section, so that there is presented to the pin an unbroken surface to absolutely guard against retractive movement thereof during the drip-supply period.

It will be remembered that when the pin 50 passes out of contact with the screw-section 46 it may engage the complemental screw-section 47, the pin, however, being held beyond the plane of the member 47 by the stop 59, which is held, preferably, by the stop on the weighing mechanism.

When the stop 59 is released, the pin and its carrier being in the positions indicated in Fig. 7, the stop will be swung to the right, as illustrated in Fig. 8, so that the roll 64 may be caused to enter the deep notch 62 in the stop 59 by the dropping of the counterweighted arm 57. When this action takes place, the pin 50 will be elevated and will be thrust between the threads of the screw-section 47, so that the pin, its carrier 50, the roll 30, and the flexible valve 28 will be carried rapidly to the left, the limit of the stroke of the pin and its carrier being indicated by the dotted lines in Fig. 8, the valve at this time having reached its closed position and entirely covering or closing the outlet-hopper H, so that the supply to the bucket G will be wholly stopped.

As a suitable means for forcing the pin 50 down and beyond the effective range of action of the screw 45 the section 47 of said screw will be provided with a circumferential cam or bulge 67. When the pin 50 reaches the end of its effective movement, it will be at about the point marked 68, Figs. 5, 7, and 8, which represents the body of the screw-section 47 and which is plain. On the rotation of such screw-section the cam 67 will come against the upper end of the pin 50 and will slide the same rapidly downward within the bore of its carrier, also depressing the guide-plate 56; and when such plate has reached the end of its downward movement it will be engaged by a suitable latch, such as that illustrated at 69, which has a hook 70 to engage over the adjacent end of the plate 56, as indicated by the dotted lines in Fig. 8, to hold said plate, and consequently the pin, against return movement. The latch 69 is in the form of a relatively small angle-lever pivotally carried by the framing of the machine, and it will be counterweighted to cause the engagement of its upright or working arm or the hook 70 thereon with the plate 56.

It will be understood that when the plate is in its depressed position the roll 64 will be below the plane of the stop-face 59', so as to permit the return of the stop 59 without hindrance. Let it be assumed that the load has been discharged and that the valve is in a condition to be opened. This being the case, the rocking frame 35 will be permitted to drop, thereby sliding the journal-blocks 31 and 32 along in their ways, the roll 30, the shaft 30' of which is which is journaled in said blocks, being of course returned therewith, and the rocking frame 29, through the medium of the connecting-link 40, being moved in a coinciding direction, so that said frame 29, being joined to the valve 28, thereby returns it to its normal or wide-open position, as indicated in Fig. 2, the valve-opening force being furnished by the two counterweights 38' and 39' on the arms 38 and 39 of the rocking frame 35.

The pin-carrier 51 is provided with a trip device 72, which is adapted to abut against the ear 73 on the upright arm of the latch 69, thereby disengaging the hook 70 from the lug 70' on the plate 56, so that at a subsequent stage in the operation the plate may be lifted in the manner previously set forth. When the plate 56 is thus released by the latch 69, it will be held against effective movement by the stop 59 and until the notch 61 of said stop is opposite the roll 64, at which time said roll is caused to enter such notch by the force of the counterweighted arm 57 in dropping.

The means for swinging the pin-holding stop 59 to the right or in a direction to release the pin 50 consist of a counterweighted arm 74, the weight 75 of which is preferably adjustable along said arm, and the action of these members will be controlled by the weighing mechanism, as will now appear.

The shaft 60, on which is mounted the stop 59, has the crank-arm 76, (see Fig. 2,) to the outer end of which is pivoted the relatively long rod 77, the free end of said rod bearing against the beam mechanism or a counterweighted lever, as 78, which constitutes a part of such beam mechanism, the rod being connected by the guide-link 79 to the framing. The lever 78 is pivotally carried by the beam B near the inner end of one of its arms and is shiftable about its center at a predetermined point or subsequent to the discharge of a bucket-load and the release of the valve 28 by interlocking stop mechanism, as will hereinafter appear.

While the bucket and beam mechanism are descending during the loading period the lever 78 forms substantially an integral extension of the beam B, so that the free end of the rod 77, which is operative with the stop 59, being against said lever the action of the stop 59 as it swings to the right will be properly governed, whereby the parts dependent upon the stop 59 for their operations cannot be prematurely started, nor can the valve 28 be closed too quickly.

When the load is being discharged, the bucket and the beam mechanism will immediately rise, but the counterweighted lever 78 will be held in its shifted position by the interlocking stop mechanism to which I have alluded. When, however, said lever is released by the release of the valve, it will simply return to its normal position and in so doing will transmit an upward thrust to the rod 77, which is transferred to the stop 59 through the intermediate shaft 60, whereby the stop 59 may be returned to its operative position or reset to again limit the effective action of the swinging plate 56 and the pin 50, controlled thereby.

For permitting the passage of the drip-stream to the nearly-loaded bucket I intercept the valve when it has nearly reached the end of its closing movement, and to do this I mount a stop on the beam mechanism. This valve-intercepting stop is designated by 80 and is of the "by-pass" type, it being counterweighted and pivoted to an ear on one of the arms of the beam B, and it is located in the path of movement of the oscillatory rod 81, which extends from the stop-shaft 60. (See Fig. 2.)

When the pin 50 has passed out of engagement with the screw member 46 on the release thereof by the swinging of the stop 59 to the right and the thrusting of the roll 64 into the notch 61 in said stop, the shaft 60 will have been rocked sufficiently to carry the rod 81 against the vertical arm of the by-pass 80, a pin being provided to hold the by-pass against oscillation during the drip period, so that the rod 81, the counterweighted arm 74, the shaft 60, and the stop 59 will be held against further movement, although the beam mechanism and the bucket continue to slowly descend, and the lever 78 on the beam B will naturally move away from the free end of the rod 77, which is also held.

When the load is completed by the drip-stream, the by-pass 80 will descend clear of the rod 81, thereby freeing the same and the connected members, whereby the stop 59 may be instantly and further swung to the right by the falling of the counterweighted arm 74. As said stop thus swings it will release the plate 56 and the pin 50, so that the latter can be forced into engagement with the screw-section 47, the thread of which is of relatively great pitch, to thereby impart the necessary and accelerated final movement to the valve for cutting off the supply-stream from the hopper H.

To trip the latch 10 to obtain the discharge of the bucket-load, the reciprocatory rod 77 will be provided with a latch-tripper 85 in the form of a projection thereon which on the final movement of the respective parts in the manner just described will be caused to impinge against the pin 86 on the latch, whereby said latch will be depressed and freed from the coöperating arm 12 of the rocker 8, which is connected to the closer L. This operation taking place, the closer L will be freed of all restraint and can be forced open by the weight of the contents within the bucket G to discharge the same into the chamber of the supporting-base, from whence they gravitate into the communicating conduit 25.

It is important to bring about the operation of the several sets of mechanism in a regular and determined order, and to do this I provide an improved organization of interlocking stop mechanism adapted to insure this result, whereby waste of the material at all points in its passage toward and from the bucket is prevented, so that an accurate registration of each load thereof can be obtained. I provide in connection with the pin-holding member 59 and the closer L a pair of reciprocally-effective stops, one of which is designated by 90, and it consists of an open segment rigidly connected to the shaft 60, the rocker 8, to which I have hereinbefore alluded, constituting the coöperating stop member.

The purpose of the stop member 90 is to prevent the opening of the closer L should the latch 10 be tripped too soon, while the function of the coöperative stop 8 is to hold the pin-limiting stop in its shifted position, as indicated in Fig. 3, and to also hold the oscillating counterweighted lever 78 against return movement with the scale-beam B on the discharge of the bucket-load. The operation of these two stops will be clearly evident from an inspection of the diagrammatic views 13 to 18, inclusive.

Figure 13:
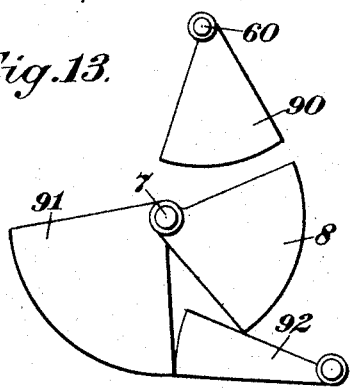

In Fig. 13 the rocking stop 8 is adjacent to the coöperating member 90, so that should the latch 10, which holds the member 8, be tripped said last-mentioned member might oscillate, but for a very short distance or until it abuts against the stop 90, which would arrest its further movement, the closer L being also held shut to prevent the escape of the contents which are within the bucket. When, however, the pin-limiting stop 59 has reached the end of its working stroke, the shaft 60 being rocked therewith, the member 90 will be caused to bodily cross the plane of the curved face of the rocking stop 8, thereby releasing said part 8, which is then free to swing about its axis, so far as the stop 90 is concerned. To prevent this action, however, I provide a second pair of safety-stops, one of which is operative with the valve, while the other is operative with the closer, the first mentioned being designated by 91, while its companion is represented by 92, the stop 91 being movable about a common axis with the rocking stop 8 and being affixed to the shaft 7. The stop 92 constitutes an integral extension of the arm 37 of the rocking frame 35, and its face is a comparatively short one.

It will be understood that the office of the stop 92 is to hold the coöperating member 91 against oscillation, and consequently the closer L, after the stop 90 is released, and its curved face will be approximately in contact with one of the straight faces of the stop 91, both of these parts being of segmental shape.

As the valve 28 is closed in the manner hereinbefore set forth, the two rocking frames 35 and 29 will be concurrently elevated by the force of the valve-closing mechanism, which will carry the stop member 92 down in synchronism therewith.

Figure 14:
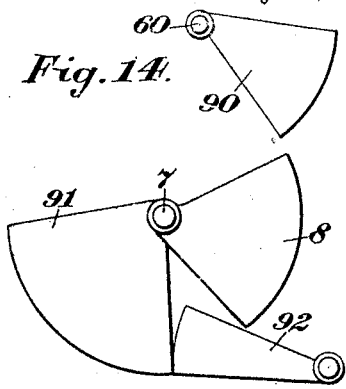
Figure 15:
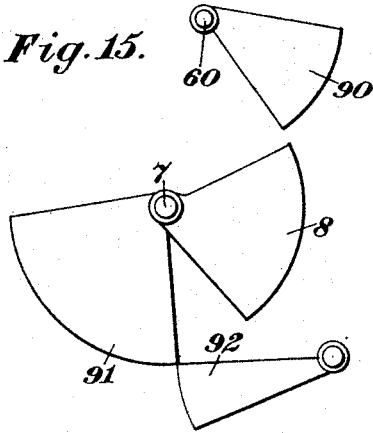
Figure 16:
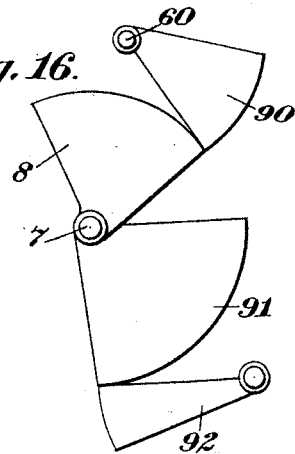

In Fig. 14 the stop 90 has released the coöperating stop 8, while the stop 92 is still in a position to prevent the movement of the stop 91, the valve at this stage in the operation not having been moved. When, however, the valve 28 has reached its cut-off position, the stop 92 will pass entirely below the plane of the curved face of the stop 91, thereby freeing the latter, so that, the latch 10 being tripped, the two stops 90 and 91 will oscillate about their axes, and in so doing the curved faces thereof will ride in contact with the adjacent straight faces of the coöperating members 8 and 92, respectively, as illustrated in Fig. 16, whereby the stop 90 is adapted to hold the pin-limiting stop 59 and the actuating-lever 78 in their respective shifted positions, as indicated in Fig. 3.

Figure 17:
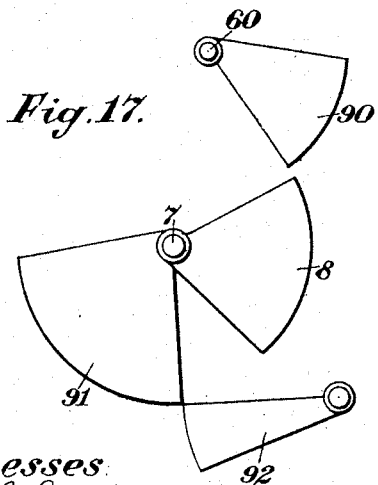
Figure 18:
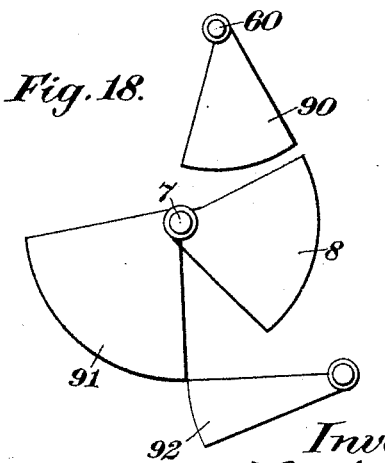

When the closer is shut, the valve will be promptly returned to its open position, and the pin-limiting stop 59 will be returned to its effective position, and in so doing the shaft 60 will swing the stop 8 from the position indicated in Fig. 17 to that shown by Fig. 18, restoring it to its closer-limiting position, the two members 90 and 91 being shown in their normal positions in said figures, and when the valve opens the stop 92 will be elevated to again retard the movement of the stop 91, as indicated in Fig. 2.

The operation of the hereinbefore-described machine briefly is as follows: Figs. 1, 2, and 4 represent the positions occupied by the various parts at the commencement of operation, the closer L being shut and held in such position by the latch 10, which is in engagement with the arm 12 of the rocker 8, and the flexible valve 28 being wide open, Fig. 4, and maintained in such position by the counterweighted frame 35, the power-transmitting pin 50 being held beyond the plane of the actuating screw-section 46 by the stop 59, with which the roll 64 of the pin-operating plate 56 is in contact. (See Figs. 5 and 11.) This being the case, a stream of material from the hopper H may pass into the empty bucket G, and when a certain proportion of the load to be weighed has been received by the bucket it, with the beam mechanism and the shiftable lever 78, will simultaneously descend, and said lever, moving away from the rod 77, will permit the counterweighted arm 74 to drop, thereby rocking the shaft 60 and swinging the stop 59 to the right or until the notch 61 thereof is opposite the roll 64, at which time said roll is thrust into said notch by the dropping of the counterweighted arm 57, and the pin 50 will be carried into engagement with the screw-section 46, so that said pin, its carrier 51, the journal-blocks 31 and 32, the roll 30, and the valve 28 will be rapidly carried to the left, so that said valve can reduce the volume of the stream which emerges from the hopper H. At this time the rod 81 will have reached the stop 80 on the beam B, which holds the rod and the stop 59, through the intervening connections, against further movement, the pin 50 at this time being in the position represented by the dotted line, Fig. 7. The drip-stream may then pass into the bucket, and when the load is completed thereby the beam mechanism will descend below the so-called "poising-line," so that the stop 80 will release the rod 81 and the connected parts, at which time the counterweighted arm 74 will again rock the shaft 60 and will swing the stop 59 to the right until the notch 62 thereof is opposite the roll 64, and into which said roll may be thrust by the weighted arm 57, which action causes the pin 50 to engage the screw-section 47, which will carry said pin and the valve 28 rapidly to the left, the valve being thereby fully closed, as illustrated in Fig. 3, to cut off the supply-stream.

When the pin 50 reaches the end of its working stroke, it will be engaged by the cam 67 and forced downward with the plate 56 until the plate is engaged by the counterweighted latch 69, as shown by the dotted lines in Fig. 8.

During the final and cut-off movement of the valve the projection 85 on the rod 77 will be caused to impinge against the pin 86 on the latch 10, thereby depressing said latch and consequently freeing the closer L, so that it may be forced open by the weight of the load within the bucket G. On the discharge of the bucket-load the several parts will resume their normal positions.

When the closer is shut, as represented in Fig. 2, the stops 8 and 91, which are connected therewith, will release the coacting stops 90 and 92, that are operative, respectively, with the shaft 60 and the rocking frame 35, so that the stream-controller or valve 28 can be retracted or opened, which operation is effected by the dropping of the counterweighted members 38 and 38' and 39 and 39' of said rocking frame. As said frame drops it will move the coacting frame 29 and the valve-actuating roll 32 therewith, so that the frame 29 can open said valve. As the roll 32 is returned to its normal position in the manner just stated the pin-carrier 51 will be moved thereby along the guide-plate 56, and when said pin-carrier has reached the end of its return stroke it will abut against the upper arm of the latch 69 and throw the same outward, so that the shoulder 70 thereof will be disengaged from the projection 70' on the guide 55, thereby releasing the latter, so that it can be elevated at the proper stage in the operation of the machine to effect the engagement of the pin 50 with the screw-section 46 to carry the valve forward.

Having described my invention, I claim—

1. The combination, with weighing mechanism, of stream-supplying means therefor; a flexible stream-controller fastened at one end to a fixed part adjacent to said stream-supplying means and at its other end connected with a reciprocatory member of the weighing mechanism; and means for engaging said stream-controller between its ends.

2. The combination, with weighing mechanism including a load-receiver, of a hopper; a flexible valve for said hopper, secured at one end to a fixed part adjacent to said hopper; a retracting device controlled by the weighing mechanism, secured to the opposite end of said valve; and means for engaging the valve between its ends to carry it across the discharge-orifice of the hopper.

3. The combination, with weighing mechanism including a load-receiver, of a hopper; a flexible valve for said hopper; means for carrying the valve across the discharge-orifice of said hopper; independent means for retracting the valve; and instrumentalities for blocking the action of said valve-retracting means on the discharge of a load.

4. The combination, with a hopper, of a flexible valve therefor; a roll for carrying the valve across the discharge-orifice of said hopper; and means independent of said roll for retracting the valve.

5. The combination, with a hopper, of a flexible valve for said hopper; a roll for carrying the valve across the discharge-orifice of the hopper; journal-blocks carrying the shaft of the roll; ways in which the blocks are located for reciprocation; and means for operating said journal-blocks.

6. The combination, with weighing mechanism, of a supply-hopper; a flexible valve attached at one end to a fixed part; a device for engaging said valve between its ends; a pin coöperative with said device; a screw; means for effecting an engagement between said pin and screw, whereby the valve can be advanced to stop the stream from the hopper; and means operative with the weighing mechanism, for retracting said valve.

7. The combination, with a hopper, of a flexible valve attached at one end to a fixed part; a valve-retracting device secured to the opposite end of said valve; a valve-advancing device for engaging the valve between its ends; and means controlled by the weighing mechanism, for operating said valve-advancing device.

8. The combination, with a hopper, of a flexible valve therefor fastened at one end to a fixed part adjacent to the hopper; a retracting device secured to the free end of said valve; a roll for engaging said valve between its ends; and means for operating said roll to thereby advance the valve.

9. The combination, with a hopper, of a flexible valve therefor; means for closing said valve, including a compound screw for imparting differential movements to the valve; and means for intercepting the progress of said valve at a predetermined point in the operation thereof.

10. The combination, with a hopper, of a valve therefor; a pin operative with the valve; a compound screw; and means for causing the pin to engage said screw.

11. The combination, with a hopper, of a valve therefor, a pin operative with said valve; a screw consisting of two sections; and means for successively causing said pin to engage said screw-sections.

12. The combination, with a hopper, of a valve therefor; a screw consisting of two sections of different diameters; a pin operative with the valve; and means for closing said pin, to successively engage said screw-sections.

13. The combination, with a hopper, of a valve therefor; a screw consisting of two sections; a pin operative with the valve; means for causing said pin to successively engage said screw-sections; and means for interrupting the movement of the pin when it passes out of contact with one of said sections.

14. The combination, with a hopper, of a valve therefor; a pin operative with said valve; a compound screw provided with a switch; and means for causing said pin to engage said screw.

15. The combination, with a hopper, of a valve therefor; a screw of variable pitch having a switch; a pin operative with the valve; a second screw-section of greater pitch than the other; and means for causing said pin to successively engage said screw-sections.

16. The combination, with a valve, of a pin operative therewith; a screw; and means for causing said pin to engage the screw, said screw having a cam adapted to retract the pin, whereby it may be carried beyond the effective range of action of the thread thereof.

17. The combination, with a valve, of a pin operative therewith; a screw having a cam; means for causing said pin to engage the screw, the cam of said screw being adapted to retract the pin, whereby it may be carried beyond the effective range of action of the thread thereof; and a latch for holding the pin in such retracted position.

18. The combination, with a hopper, of a valve therefor; a screw consisting of two sections of different pitches; and a pin operative with the valve and located to engage successively said screw-sections.

19. The combination, with a valve, of a screw consisting of two sections; and an intermediate device operative with the valve and located to successively engage said screw-sections.

20. The combination, with a hopper, of a flexible valve fastened at one end to a fixed part adjacent to the hopper; a retracting device secured to the opposite end of said valve; a roll for engaging said valve between its ends; a pin operative with said roll; a screw; and means for effecting an engagement between said pin and screw to thereby advance the valve.

21. The combination, with a valve, of a screw; a sliding pin located to engage said screw; and a carrier for said pin, said carrier being movable in a plane transverse to that of the pin.

22. The combination, with a valve, of a screw consisting of two sections; an intermediate device operative with the valve and located to successively engage said screw-sections; and instrumentalities for preventing retractive movement of said valve-operative device when it passes out of contact with one of the screw-sections.

23. The combination, with a valve, of a screw; a pin and its carrier, said pin being adapted to engage the screw and terminating in a guide; a plate embraced by said guide; and plate-operating means whereby the pin may be carried into engagement with the thread of said screw.

24. The combination, with a valve, of a screw; a pin and its carrier, said pin being adapted to engage the screw and terminating in a guide; a self-acting plate embraced by said guide; and a stop for normally limiting the effective action of said plate whereby the pin may be held beyond the range of action of the screw.

25. The combination, with a hopper, of a flexible valve fastened at one end to the framework adjacent to said hopper; a screw; a sliding pin and its carrier; a plate jointed to said pin; means for actuating the plate, to carry the pin into engagement with said screw; and a device connected with the plate, for advancing the valve when the screw is engaged by said pin.

26. The combination, with a valve, of a screw; a pin and its carrier, said pin being adapted to engage the screw and being connected to a plate which has a projecting arm; and a notched rocking stop adapted to engage said projecting arm and to subsequently release the plate.

27. The combination, with weighing mechanism, of a hopper; a valve for said hopper; a screw; a pin located to engage said screw, said pin being connected to a plate which has a projection; and a rocking stop provided with a notch, said stop being normally operable to hold the plate, and consequently the pin, beyond the range of action of the screw.

28. The combination, with weighing mechanism, of a hopper; a flexible valve secured at one end to the framework adjacent to said hopper; a movable device for engaging said valve, and having a shaft; reciprocatory journal-blocks for supporting said shaft, one of said journal-blocks having a pin or projection operative therewith; means engaging said pin or projection, to thereby advance the valve; means for blocking the retractive movement of the valve during the discharge of a load; and a valve-retracting device.

29. The combination, with a hopper, of a flexible valve; a movable device for engaging said valve and having a shaft; reciprocatory journal-blocks for supporting said shaft, one of said journal-blocks having a pin or projection operative therewith; and a screw for engaging said pin or projection, to thereby actuate the valve.

30. The combination, with a valve, of a screw having sections of different diameters; a pin operative with the valve and located to successively engage said screw-sections; a plate to which the pin is joined, said plate having an arm; and a stop for limiting the action of said plate, said stop being provided with a series of notches.

31. The combination, with weighing mechanism, of a hopper; a flexible valve; a compound screw; a pin; means for actuating said pin to carry it into engagement with the screw; a stop for normally holding said pin against movement; and means operative with the weighing mechanism, for subsequently releasing said pin.

32. The combination, with a hopper, of a valve; a screw; a pin located to engage said screw; a plate to which said pin is joined; means for depressing said plate, whereby the pin will be disconnected from said screw; a latch for engaging and holding said plate when depressed; and a latch-tripping device operative with the pin.

33. The combination, with a hopper, of a valve; a screw; a pin operative with the valve and located to engage said screw; a pin-carrier in which said pin is longitudinally reciprocatory; a plate to which said pin is joined for reciprocation transverse to its effective movement; means for depressing said plate, whereby the pin will be disconnected from the screw; a latch for engaging and holding said plate when thus depressed; and a latch-tripping device on the pin-carrier.

34. The combination, with weighing mechanism, of a hopper; a flexible valve for said hopper; a movable device for engaging said valve between its ends; and a retracting device controlled by the weighing mechanism, connected to said movable device.

35. The combination, with weighing mechanism, of a hopper; a flexible valve for said hopper; a movable device located to engage the valve, to close the same; and a pair of connected frames controlled by the weighing mechanism, one of which is attached to said movable device and is adapted to retract the valve.

36. The combination, with weighing mechanism, of a hopper; a flexible valve for said hopper; a movable device located to engage the valve, to close the same; two rocking frames, one of which is counterweighted and is connected with said movable device, and the other frame being connected with one end of the valve; and a link attached to said rocking frames.

37. The combination, with weighing mechanism including a shiftable load-discharge member, of a hopper; a flexible valve therefor; a movable device located to engage said valve between its ends, to close the same; a counterweighted frame connected to said valve for retracting the same, said frame having a stop; and a coöperative stop operative with the shiftable load-discharge member.

38. The combination, with weighing mechanism comprehending a shiftable load-discharge member, of a hopper and its valve having a stop operative therewith; a coacting stop operative with the shiftable load-discharge member; valve-closing means comprehending an actuating-screw and an engaging pin therefor; a pin-limiting stop mounted on a shaft and having a rod; a shiftable actuator in operative relation with said rod; and a second pair of coacting stops operative, respectively, with the pin-limiting stop and with the shiftable load-discharge member.

39. The combination, with weighing mechanism comprehending a shiftable load-discharge member and with a shaft operative therewith, of a fluid-casing surrounding said shaft; a disk on said shaft and located within the casing; and a blade passing, respectively, through said disk and shaft.

40. The combination, with a load-receiver having a discharge-outlet; of a closer for said outlet, connected to the load-receiver; a shaft having a pair of crank-arms connected by rods to said closer, each of said rods being extended below said closer and having a shoe; and a plate attached to said shoes.

41. The combination, with a bucket having a closer, of closer-holding means including a pair of rods extended below the closer and each having a wing; and a regulator-plate attached to said wings.

FRANCIS H. RICHARDS.

Witnesses:
FRED. J. DOLE,
BENTON N. PARKER.